US011491941B2

United States Patent
Nakamura et al.

(10) Patent No.: US 11,491,941 B2
(45) Date of Patent: Nov. 8, 2022

(54) VEHICLE OCCUPANT PROTECTION CONTROL DEVICE, VEHICLE OCCUPANT PROTECTION CONTROL METHOD, AND PROGRAM

(71) Applicant: HONDA MOTOR CO., LTD., Tokyo (JP)

(72) Inventors: Hidetoshi Nakamura, Wako (JP); Hiroshi Akaba, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 551 days.

(21) Appl. No.: 16/488,955

(22) PCT Filed: Mar. 16, 2017

(86) PCT No.: PCT/JP2017/010653
§ 371 (c)(1),
(2) Date: Aug. 27, 2019

(87) PCT Pub. No.: WO2018/167911
PCT Pub. Date: Sep. 20, 2018

(65) Prior Publication Data
US 2020/0010040 A1 Jan. 9, 2020

(51) Int. Cl.
*B60R 21/015* (2006.01)
*B60R 21/207* (2006.01)
(Continued)

(52) U.S. Cl.
CPC ...... *B60R 21/01554* (2014.10); *B60R 21/207* (2013.01); *B60N 2/14* (2013.01);
(Continued)

(58) Field of Classification Search
CPC combination set(s) only.
See application file for complete search history.

(56) References Cited

U.S. PATENT DOCUMENTS 9,604,588 B1    3/2017 Rao et al.
9,744,933 B1 *  8/2017 Rao ................. B60N 2/143
(Continued)

FOREIGN PATENT DOCUMENTS

CN    1819938       8/2006
CN    201300751     9/2009
(Continued)

OTHER PUBLICATIONS

Chinese Office Action for Chinese Patent Application No. 201780088128.X dated Apr. 28, 2021.
(Continued)

*Primary Examiner* — Anne Marie Antonucci
*Assistant Examiner* — Amelia Vorce
(74) *Attorney, Agent, or Firm* — Amin, Turocy & Watson, LLP

(57) ABSTRACT

A vehicle occupant protection control device includes: a seat state detector configured to detect directions of first and second seats inside a vehicle; and a vehicle occupant protection controller configured to open at least one of a first bag body that is opened on a first side in a width direction of the first seat and a second bag body that is opened on a second side diagonal to the first side in a width direction of the second seat in a state in which the first seat faces the second seat when the seat state detector detects that the first seat faces the second seat and an impact on the vehicle is detected or predicted. A first vehicle occupant sitting on the first seat is pressed on the second side in accordance with the opening of the first bag body or a second vehicle occupant sitting on the second seat is pressed on the first side in accordance with the opening of the second bag body.

10 Claims, 10 Drawing Sheets

(51) Int. Cl.
- *B60R 21/01* (2006.01)
- *B60N 2/14* (2006.01)
- *B60R 21/0134* (2006.01)
- *B60R 21/0136* (2006.01)

(52) U.S. Cl.
CPC ....... *B60R 21/0134* (2013.01); *B60R 21/0136* (2013.01); *B60R 2021/01034* (2013.01)

(56) References Cited

U.S. PATENT DOCUMENTS

| | | | |
|---|---|---|---|
| 10,647,286 B1* | 5/2020 | Dennis | B60R 21/232 |
| 2016/0144818 A1* | 5/2016 | Mihm | B60N 2/4235 |
| | | | 280/730.2 |
| 2016/0159307 A1* | 6/2016 | Fujiwara | B60R 21/013 |
| | | | 280/729 |
| 2016/0272141 A1 | 9/2016 | Ohmura | |
| 2017/0232922 A1* | 8/2017 | Wiik | B60R 21/237 |
| | | | 280/730.2 |
| 2017/0267205 A1* | 9/2017 | Numazawa | B60R 21/207 |
| 2017/0297524 A1* | 10/2017 | Sugie | B60R 21/233 |
| 2018/0126941 A1* | 5/2018 | Faruque | B60R 21/2338 |
| 2018/0186324 A1* | 7/2018 | Faruque | B60R 22/14 |
| 2019/0193666 A1* | 6/2019 | Jost | B60R 21/232 |
| 2022/0041126 A1* | 2/2022 | Breed | B60R 21/30 |

FOREIGN PATENT DOCUMENTS

| | | |
|---|---|---|
| CN | 104943647 | 9/2015 |
| DE | 102016102897 | 9/2019 |
| JP | 10-129405 | 5/1998 |
| JP | 10-324221 | 12/1998 |
| JP | 11-170961 | 6/1999 |
| JP | 2016-175513 | 10/2016 |

OTHER PUBLICATIONS

International Search Report and Written Opinion for International Application Serial No. PCT/JP2017/010653 dated Jun. 6, 2017, 10 pages.

* cited by examiner

VEHICLE OCCUPANT PROTECTION CONTROL DEVICE, VEHICLE OCCUPANT PROTECTION CONTROL METHOD, AND PROGRAM

TECHNICAL FIELD

The present invention relates to a vehicle occupant protection control device, a vehicle occupant protection control method, and a program.

BACKGROUND ART

In the related art, technologies for operating a vehicle occupant protection device that is necessary for protecting a vehicle occupant among a plurality of kinds of vehicle occupant protection devices based on a current seat state and a vehicle collision occurrence detection result and controlling the plurality of kinds of vehicle occupant protection devices such that operations of the vehicle occupant protection devices that are not necessary for protecting the vehicle occupant are prohibited have been disclosed (for example, see Patent Document 1).

CITATION LIST

Patent Literature

[Patent Document 1]
Japanese Unexamined Patent Application, First Publication No. 2016-175513

SUMMARY OF INVENTION

Technical Problem

However, it is preferable to operate the vehicle occupant protection device more appropriately in accordance with a seat state.

The present invention is devised in view of such circumstances and an object of the present invention is to provide a vehicle occupant protection control device, a vehicle occupant protection control method, and a program capable of operating a vehicle occupant protection device appropriately.

Solution to Problem

According to an aspect, a vehicle occupant protection control device includes: a seat state detector configured to detect directions of a first seat and a second seat inside a vehicle; and a vehicle occupant protection controller configured to open at least one of a first bag body that opens on a first side in a width direction of the first seat and a second bag body that opens on a second side diagonal to the first side in a width direction of the second seat in a state in which the first seat faces the second seat when the seat state detector detects that the first seat faces the second seat and an impact on the vehicle is detected or predicted. A first vehicle occupant sitting on the first seat is pressed on the second side in accordance with the opening of the first bag body or a second vehicle occupant sitting on the second seat is pressed on the first side in accordance with the opening of the second bag body.

According to another aspect, in the vehicle occupant protection control device, the first bag body is provided in the first seat. The second bag body is provided in the second seat.

According to another aspect, in the vehicle occupant protection control device, when the seat state detector detects that the first seat faces the second seat and an impact on the vehicle is detected or predicted, the vehicle occupant protection controller opens the bag body that is positioned closer to a side on which the impact is received between sides on which the impact is detected or predicted.

According to another aspect, in the vehicle occupant protection control device, a seat belt of the second seat binds a shoulder on the same side as a shoulder of the first vehicle occupant bound by a seat belt of the first seat. The first side is a side on which the shoulder of the first vehicle occupant is not bound by the seat belt. The second side is a side on which a shoulder of the second vehicle occupant is not bound by the seat belt.

According to another aspect, in the vehicle occupant protection control device, the vehicle occupant protection controller may open the first bag body on a side which is the first side and is outside of a width of the first seat and open the second bag body on a side which is the second side and is outside of a width of the second seat.

According to another aspect, in the vehicle occupant protection control device, the vehicle occupant protection controller opens the first bag body to a position including a region to which the upper body of the second vehicle occupant is estimated to be moved in accordance with the opening of the second bag body and opens the second bag body to a position including a region to which the upper body of the first vehicle occupant is estimated to be moved in accordance with the opening of the first bag.

According to another aspect, in the vehicle occupant protection control device, the first seat may further include a third bag body that opens on a third side opposite to the first side in the width direction. The second seat further includes a fourth bag body that opens on a fourth side opposite to the second side in the width direction and diagonal to the third side in the state in which the first seat faces the second seat. When the seat state detector detects that the first seat faces the second seat and an impact on the vehicle is detected or predicted, the vehicle occupant protection controller may open the bag body that is positioned closer to a side on which the impact is received between sides on which the impact is detected or predicted and the bag body that opens on a side diagonal to the side closer to the side on which the impact is received.

According to another aspect, in the vehicle occupant protection control device, the second seat further includes the fourth bag body that opens on a fourth side opposite to the second side in the width direction and diagonal to the third side opposite to the first side in the width direction in the state in which the first seat faces the second seat. When the seat state detector does not detect that the first seat faces the second seat and an impact on the vehicle is detected or predicted, the vehicle occupant protection controller may open the first and fourth bag bodies.

According to another aspect, in the vehicle occupant protection control device, when the seat state detector does not detect that the first seat faces the second seat and an impact on the vehicle is detected or predicted, the vehicle occupant protection controller may narrow an opening region in which the first bag body is opened more than when the seat state detector detects that the first seat faces the second seat.

According to another aspect, a vehicle occupant protection control method causes an in-vehicle computer to perform: detecting directions of first and second seats inside a vehicle; opening at least one of a first bag body that opens on a first side in a width direction of the first seat and a second bag body that opens on a second side diagonal to the first side in a width direction of the second seat in a state in which the first seat faces the second seat when it is detected that the seat state detector detects that the first seat faces the second seat and an impact on the vehicle is detected or predicted; and pressing a first vehicle occupant sitting on the first seat on the second side in accordance with the opening of the first bag body or pressing a second vehicle occupant sitting on the second seat on the first side in accordance with the opening of the second bag body.

According to another aspect, a non-transitory computer-readable storage medium that stores a computer program to be executed by a computer to perform at least: detecting directions of first and second seats inside a vehicle; opening at least one of a first bag body that opens on a first side in a width direction of the first seat and a second bag body that opens on a second side diagonal to the first side in a width direction of the second seat in a state in which the first seat faces the second seat when it is detected that the seat state detector detects that the first seat faces the second seat and an impact on the vehicle is detected or predicted; and pressing a first vehicle occupant sitting on the first seat on the second side in accordance with the opening of the first bag body or pressing a second vehicle occupant sitting on the second seat on the first side in accordance with the opening of the second bag body.

Advantageous Effects of Invention

According to an aspect, it is possible to appropriately operate the vehicle occupant protection device.

According to another aspect, by opening the bag body on a side on which the shoulder of the first vehicle occupant is not bound by the seat belt, it is possible to suppress separation of the upper body of the vehicle occupant from the seat even when a force pressing the vehicle occupant and moving the upper body of the vehicle occupant from the seat is applied.

According to another aspect, even when the bag body is opened and the upper body of the vehicle occupant is moved from the seat, the bag body provided in the set facing the seat on which the moved vehicle occupant is sitting catches the upper body of the vehicle occupant pressed and moved in accordance with the opening of the bag body. Therefore, it is possible to more reliably protect the vehicle occupant.

According to another aspect, it is possible to open the bag body that is positioned closer to the side on which an impact is received between sides on which the impact is detected or predicted and the bag body that opens on a side diagonal to the side close in the direction in which the impact is received.

According to another aspect, when the first seat does not face the second seat, the vehicle occupant can be protected from an impact applied from the outside of the vehicle by opening the bag body on the side facing the outside of the vehicle.

According to another aspect, by narrowing an opening region in which the first bag body is opened when the first seat does not face the second seat more than in the state in which the first seat faces the second seat, it is possible to quickly open the bag body and it is possible to suppress opening of the bag body in an unnecessary region.

DESCRIPTION OF EMBODIMENTS

Hereinafter, embodiments of a vehicle occupant protection control device, a vehicle occupant control method, and a program according to the present invention will be described with reference to the drawings. Hereinafter, the description will be made using XYZ coordinates as necessary. The positive X direction is a traveling direction of the vehicle M, and the positive Y direction is a direction that is substantially perpendicular to the traveling direction and is on the left side of the traveling direction of the vehicle M. The positive Z direction is a direction intersecting the X and Y directions and is an opposite direction to the approximately vertical direction.

The vehicle occupant protection control device, the vehicle occupant protection control method, and the program according to an embodiment are applied to, for example, an automated driving vehicle. The vehicle occupant protection control device, the vehicle occupant protection control method, and the program are not limited thereto and may be applied to a manual driving vehicle. In this case, for example, the vehicle occupant protection control device, the vehicle occupant protection control method, and the program control side airbags provided in back seats.

First Embodiment

Figure 1:
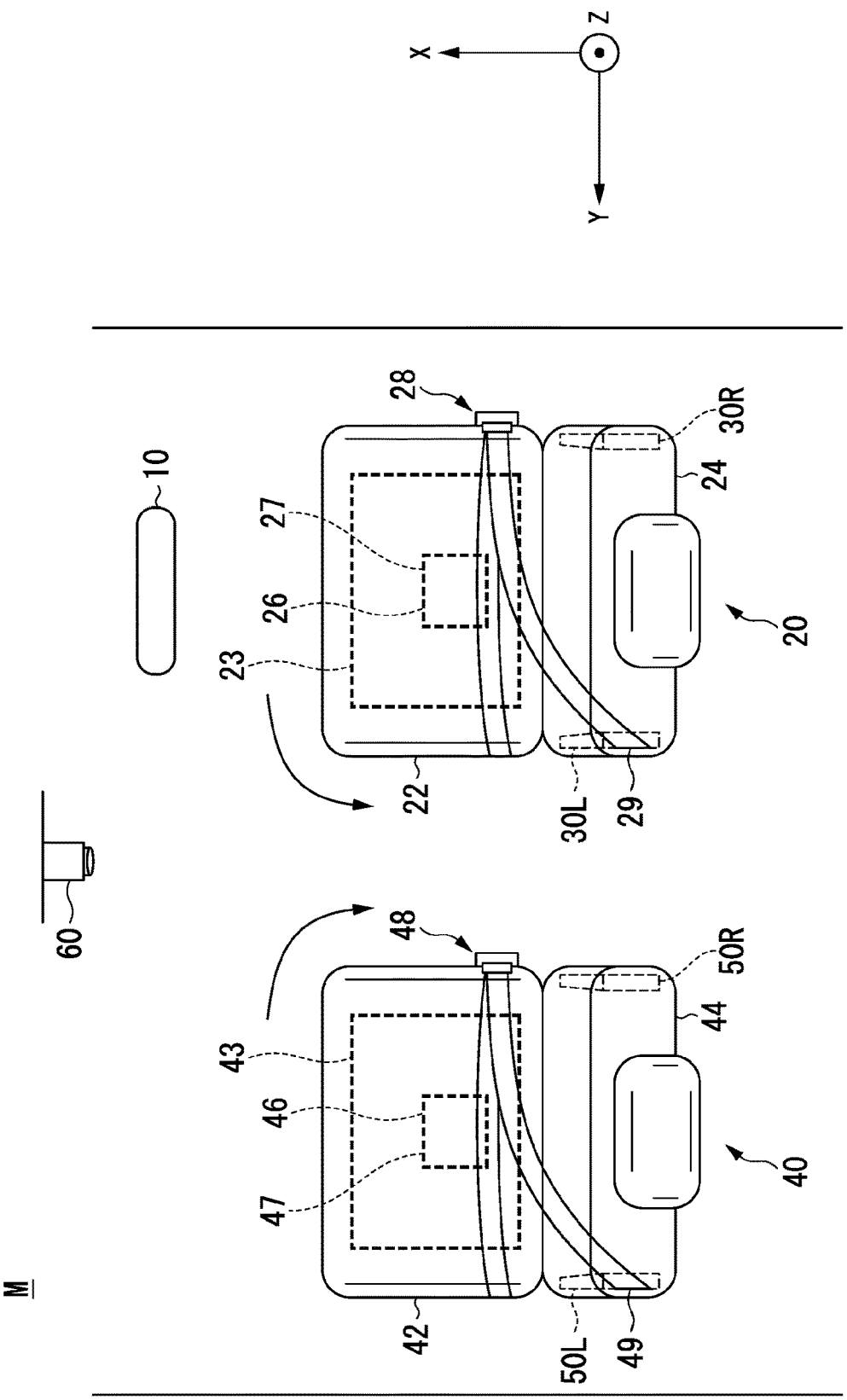
FIG. 1 is a diagram showing examples of a first seat 20 and a second seat 40 provided in a vehicle M in which a vehicle occupant protection control device is mounted.

FIG. 1 is a diagram showing examples of a first seat 20 and a second seat 40 provided in a vehicle M in which a vehicle occupant protection control device is mounted. In FIG. 1, seats other than the first seat 20 and the second seat 40 are not shown. The first seat 20 is a seat of a driver side on which a steering wheel 10 is provided. The first seat 20 includes a seat portion (seat cushion) 22 and a backrest (seat back) 24. A seating sensor 23 is provided in the seat portion 22. The seating sensor 23 is, for example, a pressure sensor laid inside the seat portion 22 and outputs information indicating a pressure change to a vehicle occupant protection control device 80 to be described below.

One end of a rotation supporter 26 rotating the seat portion 22 with respect to a floor surface is attached on the floor side of the vehicle M in the seat portion 22. The other end of the rotation supporter 26 is attached to the floor surface of the vehicle M. The seat portion 22 is attached to the floor surface via the rotation supporter 26. The rotation supporter 26 is a member in which a floor-side supporter which is a member on the floor surface side and a seat-side supporter which is a member on the side of the seat portion 22 are rotatable.

A seat angle sensor 27 is provided in the rotation supporter 26. The seat angle sensor 27 detects a rotational angle of the seat-side supporter with respect to the floor-side supporter and outputs a detection result to the vehicle occupant protection control device 80. When the first seat 20 faces forward (in the case of a standard position), the detection result of the seat angle sensor 27 is zero degrees. It is assumed that the seat angle sensor 27 outputs a positive value when the direction of the first seat 20 is inclined clockwise with respect to the standard direction, and outputs a negative value when the direction of the first seat 20 is inclined counterclockwise with respect to the standard direction.

A seat belt 28 is provided in the first seat 20. The seat belt 28 includes a retractor, a webbing, and a buckle. The retractor is provided in an upper portion of the backrest 24 and on the positive Y side in the width direction of the first seat 20. The webbing is a belt wound by the retractor. The webbing is restrained from being drawn by the retractor when the webbing is drawn at a predetermined speed or more. The buckle is provided on the negative Y side in the width direction of the seat portion 22 and is a member in which a tongue is detachably mounted. The tongue is a member that is movable in the longitudinal direction of the webbing and can be detachably mounted in the buckle. When a vehicle occupant is sitting on the first seat 20 and uses the seat belt 28, the vehicle occupant draws the webbing from the retractor and connects the tongue to the buckle so that the left shoulder of the vehicle occupant and the right and left hipbones are mainly bound. Thus, the vehicle occupant is bound by the seat belt 28 in the state in which the webbing is restrained from being drawn by the retractor.

A pretensioner 29 is provided in the retractor. The pretensioner 29 removes sagging occurring between the vehicle occupant and the webbing by winding the webbing on the retractor when a predetermined control condition is satisfied. Thus, for example, when a vehicle receives an impact or the like, movement of the vehicle occupant from the seat is suppressed.

A side airbag 30R is stored in the width direction (the negative Y direction) of the backrest 24 and a side airbag 30L is stored in the width direction (the positive Y direction) of the backrest 24. Hereinafter, when the side airbags 30R and 30L are not distinguished from each other, the side airbags 30R and 30L are referred to as "the side airbags 30."

The side airbags 30 are controlled by the vehicle occupant protection control device 80 to be described below. The side airbags 30 include, for example, inflators and bag bodies 31R and 31L. The bag body 31R is stored, for example, on one side (the negative Y side) in the width direction of the first seat 20 of the backrest 24 and the bag body 31L is stored, for example, on the other side (the positive Y side) in the width direction of the first seat 20 of the backrest 24. The bag bodies 31 are opened to press the upper body of a vehicle occupant sitting on the first seat 20 to the side diagonal to the first seat 20. When an instruction to open the bag bodies 31 is acquired from the vehicle occupant protection control device 80, the side airbags 30 transmits a gas generated by operating the inflators to the bag bodies 31. Thus, the vehicle occupant is protected by opening the bag bodies 31 in a predetermined area.

The second seat 40 includes a seat portion 42 and a backrest 44. One end of a rotation supporter 46 rotating the seat portion 42 with respect to a floor surface is attached on the floor side of the vehicle M of the in the seat portion 42. A seating sensor 43 is provided in the seat portion 42. The seating sensor 43 has a similar configuration to the seating sensor 23. The other end of the rotation supporter 46 is attached to the floor surface of the vehicle M. The seat portion 42 is attached to the floor surface via the rotation supporter 46. The seat portion 42, the backrest 44, and the rotation supporter 46 have similar functional configurations with similar names to those of the first seat 20. A seat angle sensor 47 that has a similar functional configuration to the seat angle sensor 27 is provided in the rotation supporter 46.

A seat belt 48 and a pretensioner 49 are provided in the second seat 40. The seat belt 48 has a similar functional configuration to the seat belt 28 of the first seat 20.

A side airbag 50R including a bag body 51R is stored in the width direction (the negative Y direction) of the backrest 44 and a side airbag 50L including a bag body 51L is stored in the width direction (the positive Y direction) of the backrest 24. Hereinafter, when the side airbags 50R and 50L are not distinguished from each other, the side airbags 50R and 50L are referred to as "the side airbags 50." The functional configuration of the side airbags 50 is similar to that of the side airbag 30. When the side airbags 30 and 50 are not distinguished from each other, the side airbags 30 and 50 are simply referred to as "the side airbags SA (which is an example of a vehicle occupant protection device)."

The vehicle M includes a vehicle interior camera 60 that images the interior of the vehicle. The vehicle interior camera 60 is, for example, a digital camera that uses a solid-state image sensor such as a charge coupled device (CCD) or a complementary metal oxide semiconductor (CMOS). One vehicle interior camera 60 or a plurality of vehicle interior cameras 60 are attached any positions of the vehicle M. For example, the vehicle interior camera 60 repeatedly images the interior of the vehicle periodically. The vehicle interior camera 60 may be a stereo camera.

Figure 2:
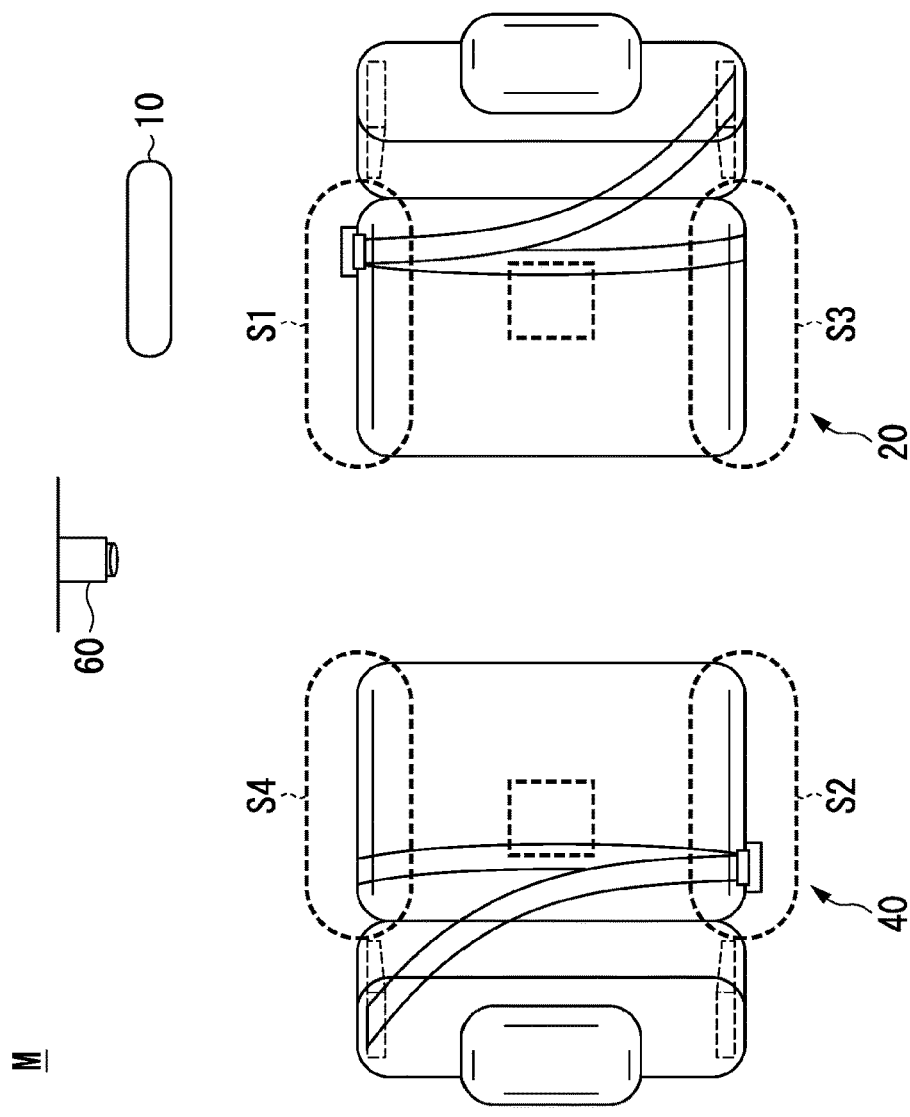
FIG. 2 is a diagram showing a rotation situation in which the first seat 20 faces the second seat 40.

FIG. 2 is a diagram showing a rotation situation in which the first seat 20 faces the second seat 40. In the shown example, the first seat 20 is rotated negative 90 degrees from the standard position so that the first seat 20 faces in the positive Y direction. The second seat 40 is rotated positive 90 degrees from the standard position so that the second seat 40 faces in the negative Y direction. That is, the first seat 20 faces the second seat 40. "Facing" is not limited to the front of the first seat 20 facing the front of the second seat 40, but also includes the front of the first seat 20 facing the front of the second seat 40 within a predetermined angle range. For example, facing also includes a case in which the front of the first seat 20 is rotated at about negative 70 to 110 degrees and the front of the second seat 40 is rotated at positive 70 to 110 degrees. In this way, when the first seat 20 faces the second seat 40 during automated driving, as shown, comfort of vehicle occupants inside the vehicle is improved.

Hereinafter, a side on which the bag body 31R (first bag body) opens is referred to as a "first side (S1 in the drawing)" in the width direction of the first seat 20 and a side on which the bag body 51R (second bag body) opens is referred to as a "second side (S2 in the drawing)" in some cases. The second side is a side diagonal to the first side in the width direction of the second seat 40 when the first seat 20 faces the second seat 40. An opposite side to the first side in the width direction of the first seat 20 in which the bag body 31L (third bag body) opens is referred to as a "third side (S3 in the drawing)" and a side on which the bag body 51L (fourth bag body) opens is referred to as a "fourth side (S4 in the drawing)." The fourth side is an opposite side to the second side in the width direction of the second seat 40 and is a side diagonal to the third side opposite to the first side in the width direction of the first seat 20 when the first seat 20 faces the second seat 40.

Figure 3:
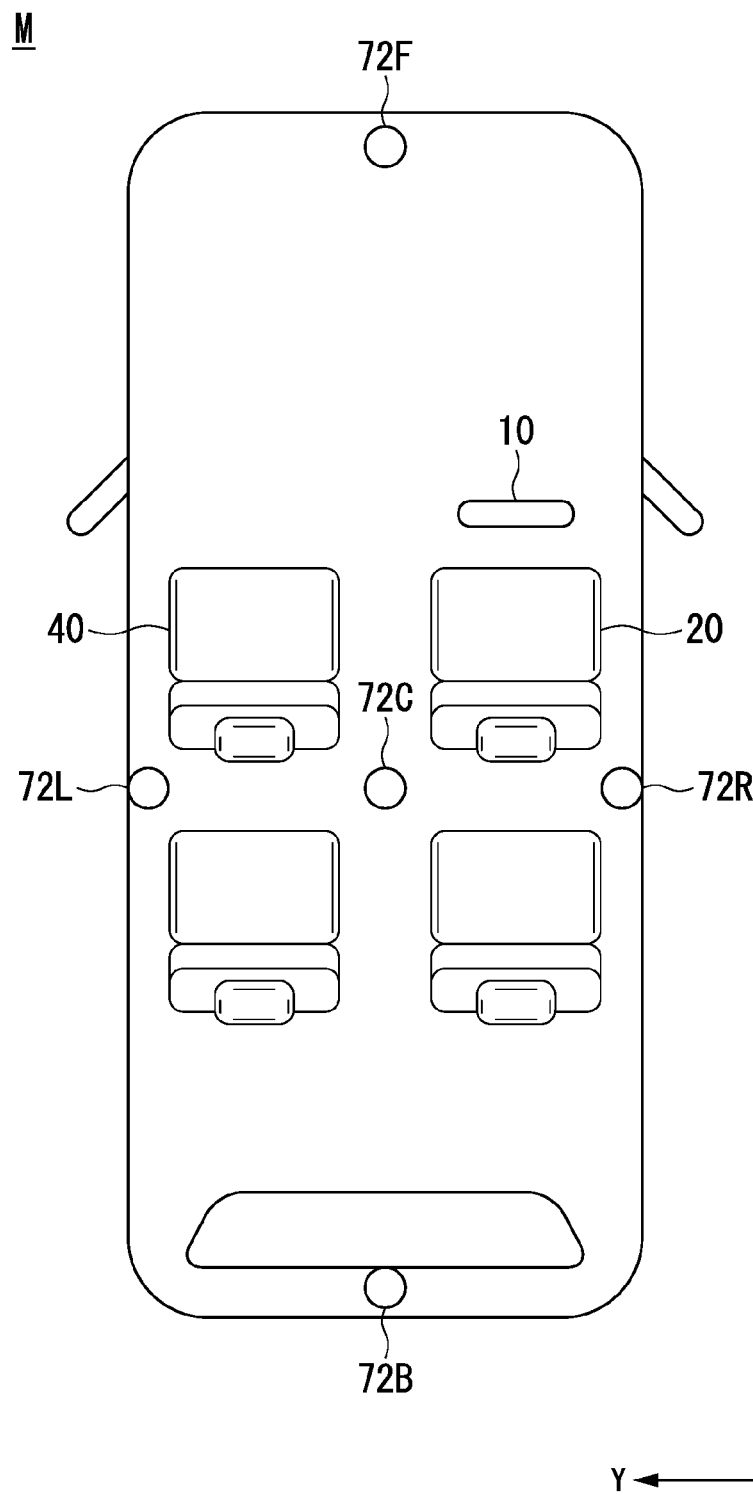
FIG. 3 is a diagram showing an example of an acceleration sensor 72 provided in the vehicle M.

The vehicle M further includes acceleration sensors 72F, 72B, 72R, 72L, and 72C. When the acceleration sensors 72F, 72B, 72R, 72L, and 72C are not particularly distinguished from each other, the acceleration sensors 72F, 72B, 72R, 72L, and 72C are simply referred to as "the acceleration sensors 72." The acceleration sensors 72 are sensors that detect acceleration applied to the vehicle M. FIG. 3 is a diagram showing an example of the acceleration sensors 72 provided in the vehicle M. The acceleration sensors 72F, 72B, 72R, 72L, and 72C are provided at the front, the rear, the right, the left, and the center of gravity of the vehicle M, respectively. The acceleration sensors 72F, 72B, 72R, 72L, and 72C detect magnitude of acceleration applied to the front, the rear, the right, the left, and the center of gravity of the vehicle M, respectively, and output detection results to the vehicle occupant protection control device 80. When the magnitude of the acceleration input from each of two of the acceleration sensors 72, the acceleration sensor 72C and another acceleration sensor 72, exceeds a set threshold, the vehicle occupant protection control device 80 determines that an impact is detected.

The acceleration sensor 72 may include a comparator and may output a predetermined signal when acceleration equal to or greater than the threshold is detected. In this case, the vehicle occupant protection control device 80 determines that an impact is detected when predetermined signals are input from two of the acceleration sensors 72, the acceleration sensor 72C and another acceleration sensor 72.

Figure 4:
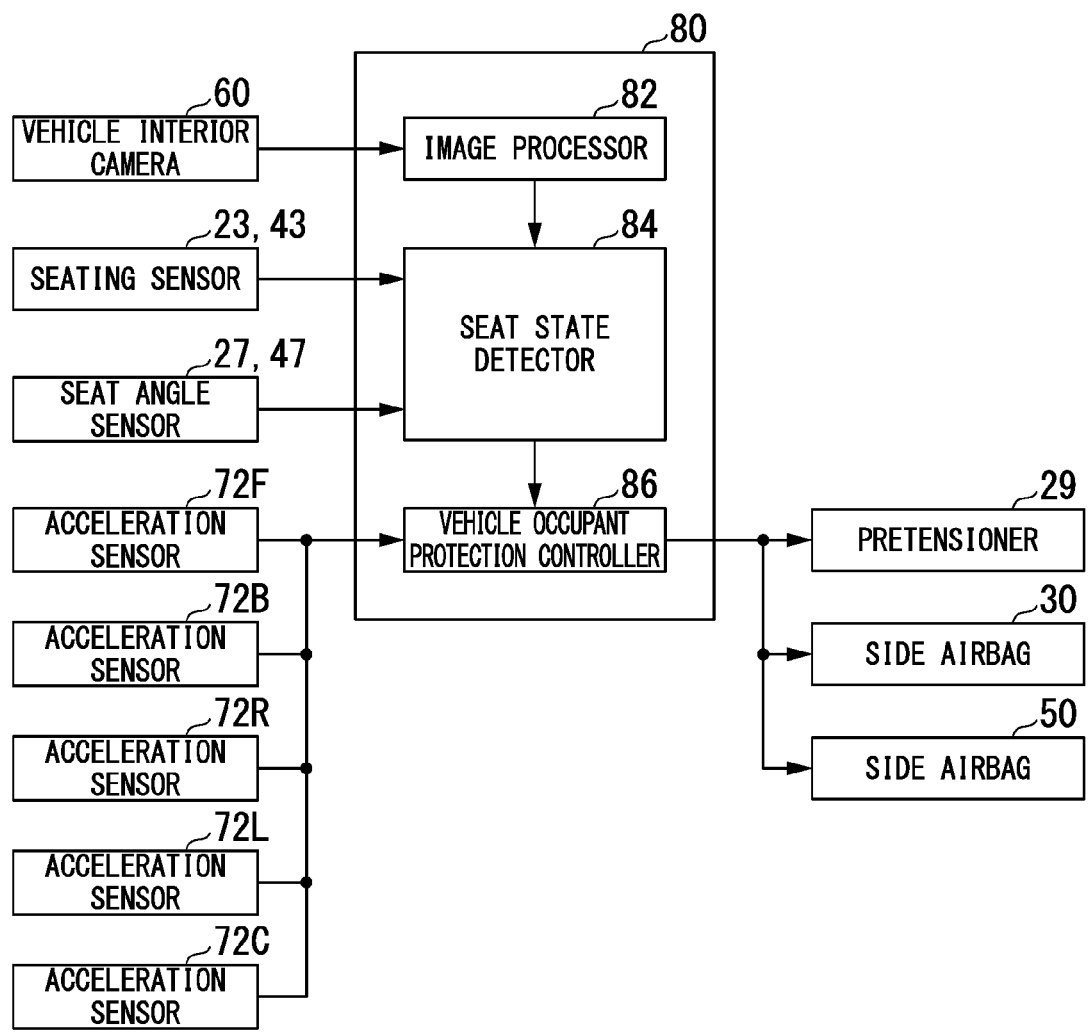
FIG. 4 is a diagram showing a functional configuration centered on a vehicle occupant protection control device 80.

FIG. 4 is a diagram showing a functional configuration centered on a vehicle occupant protection control device 80. The vehicle M further includes a vehicle occupant protection control device 80. The vehicle occupant protection control device 80 includes, for example, an image processor 82, a seat state detector 84, and a vehicle occupant protection controller 86. The image processor 82, the seat state detector 84, and the vehicle occupant protection controller 86 are implemented by a processor such as a CPU executing a program. Some or all of the functional units may be implemented by hardware such as a large scale integration (LSI) circuit, an application specific integrated circuit (ASIC), or a field-programmable gate array (FPGA) or may be implemented by hardware and software in cooperation.

The image processor 82 acquires an image captured by the vehicle interior camera 60, performs an image recognition process on the acquired image, and recognizes the disposition of the first seat 20 or the second seat 40 and a vehicle occupant sitting on the first seat 20 or the second seat 40. The image processor 82 outputs a result of the image recognition process to the seat state detector 84. Hereinafter, when the first seat 20 and the second seat 40 are not distinguished from each other, the first seat 20 and the second seat 40 are referred to as "vehicle interior seats" in some cases.

The image processor 82 obtains pixels or a pixel group with a large luminance difference from peripheral pixels as feature points (edge) in the image captured by the vehicle interior camera 60 and recognizes the contour of a vehicle interior seat or a vehicle occupant from the feature points.

Contours recognized from the feature points obtained from images captured in advance by an experiment or the like and obtained by imaging vehicle interior seats, vehicle occupants, and vehicle occupants sitting on the seats are stored in a storage device included in the vehicle occupant protection control device 80. The image processor 82 compares vehicle interior seats, vehicle occupants, and the contours of the vehicle occupants stored in advance in the storage device with a result of a process of recognizing images captured by the vehicle interior camera 60, recognizes contours estimated as the vehicle interior seats and the vehicle occupants, and recognizes the disposition of the seats, presence or absence of vehicle occupants, states of vehicle occupants, or the like based on the recognition result. For example, the image processor 82 compares vehicle interior seats, vehicle occupants, and the contours of the vehicle occupants stored in advance in the storage device with a result of a process of recognizing images captured by the vehicle interior camera 60, recognizes that a vehicle occupant is sitting on the vehicle interior seat when a contour estimated as the sitting vehicle occupant is added to the contours of the vehicle interior seats, and recognizes that no vehicle occupant is sitting when no contour is added.

For example, the seat state detector 84 detects whether a vehicle occupant is sitting on the first seat 20 or the second seat 40 based on both a detection result of the seating sensors 23 and 43 and a recognition result of the image processor 82. An infrared sensor may be provided inside the vehicle M and whether a vehicle occupant is sitting on the seat may be detected based on a detection result of the infrared sensor.

The seat state detector 84 detects whether the first seat 20 faces the second seat. The seat state detector 84 detects the facing state based on detection results by the seat angle sensor 27 and the image processor 82.

When the seat state detector 84 detects that the first seat 20 faces the second seat 40 and an impact on the vehicle is detected or predicted, the vehicle occupant protection controller 86 opens at least one of the first bag body 31R and the second bag body 51R so that contact between a first vehicle occupant sitting on the first seat 20 and a second vehicle occupant sitting on the second seat 40 is suppressed.

The vehicle occupant protection controller 86 opens the bag bodies of the airbags SA when it is determined that an impact is detected based on a detection result (or a predetermined signal) of the acceleration sensor 72.

More specifically, when a detection result of the acceleration sensor 72R is equal to or greater than a first threshold and a detection result of the acceleration sensor 72C is equal to or greater than a second threshold, the vehicle occupant protection controller 86 estimates that an impact is received from the right side and opens the bag bodies of the side airbags SA to protect vehicle occupants from the impact received from the right side. When a detection result of the acceleration sensor 72F is equal to or greater than a third threshold and a detection result of the acceleration sensor 72C is equal to or greater than the second threshold, the vehicle occupant protection controller 86 estimates that an impact is received from the front side and opens the bag bodies of the side airbags SA to protect vehicle occupants from the impact received from the front side. When detection results of the acceleration sensors 72F and 72R are equal to or greater than a fourth threshold and a detection result of the acceleration sensor 72C is equal to or greater than a fifth threshold, the vehicle occupant protection controller 86 estimates that an impact is received from the front right side and opens the bag bodies of the side airbags SA to protect vehicle occupants from the impact received from the front right side. The first to fifth thresholds may be the same value or may be different values. The details of the process by the vehicle occupant protection controller 86 will be described later.

Figure 5:
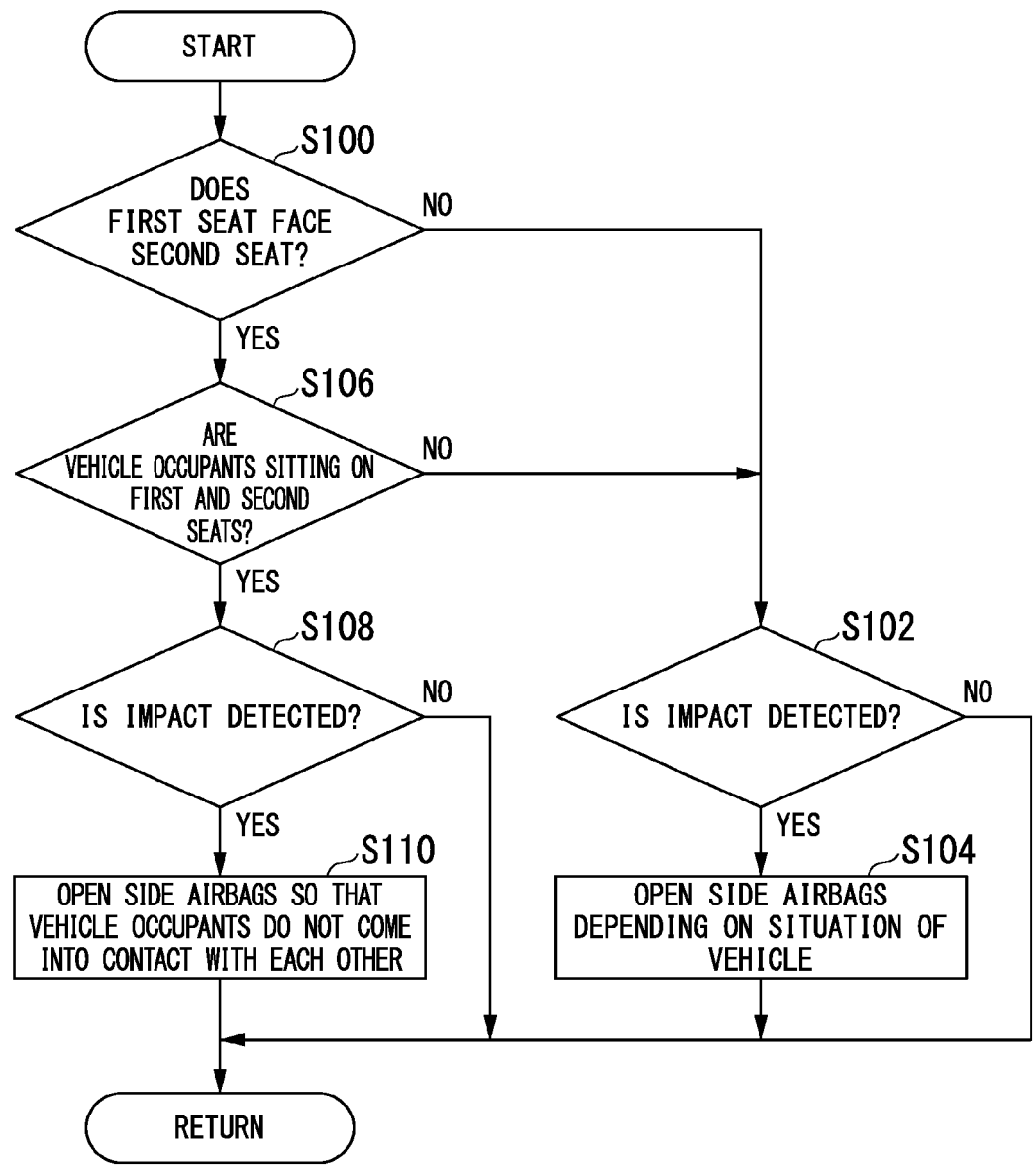
FIG. 5 is a flowchart showing a flow of a process performed by the vehicle occupant protection control device 80.

FIG. 5 is a flowchart showing a flow of a process performed by the vehicle occupant protection control device 80. First, the seat state detector 84 determines whether the first seat 20 faces the second seat 40 (step S100). When the first seat 20 does not face the second set 40, the vehicle occupant protection controller 86 determines whether an impact is detected based on the detection results of the acceleration sensors 72 (step S102). When no impact is detected, the process of one routine of the flowchart ends.

Figure 6:
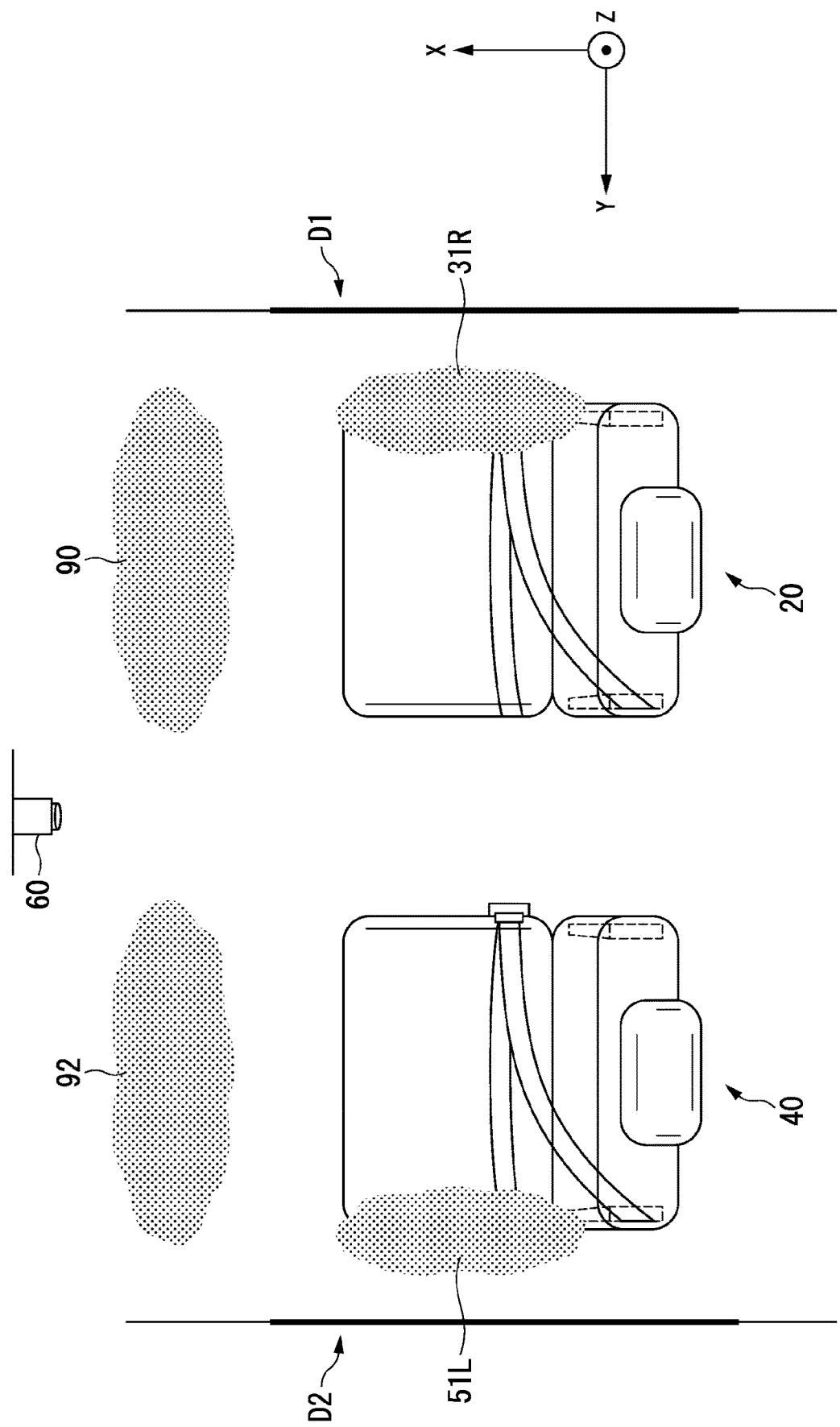
FIG. 6 is diagram showing a situation in which a bag body 31R of a side airbag 30R and a bag body 50L of a side airbag 50L are opened.

When the impact is detected, the vehicle occupant protection controller 86 opens the bag body of the side airbag SA provided in the first seat 20 depending on a situation of the vehicle M (step S104). The situation of the vehicle M is a direction in which acceleration is applied to the vehicle M, a vehicle travel state, or the like. When the first seat 20 does not face the second seat 40, the vehicle occupant protection controller 86 opens, for example, the side airbags SA (the bag body 31R of the side airbag 30R and bag body 51L of the side airbag 50L) between the vehicle occupant and a door D (D1 or D2 of FIG. 6) of the vehicle M. FIG. 6 is diagram showing a situation in which the bag body 31R of the side airbag 30R and the bag body 51L of the side airbag 50L are opened.

In this case, the vehicle occupant protection controller 86 may open the bag body 31L of the side airbag 30L and the bag body 51R of the side airbag 50R between the first seat 20 and the second seat 40 so that the vehicle occupant sitting on the first seat 20 and the vehicle occupant sitting on the second seat 40 are not moved from the vehicle interior seats and do not come into contact with each other. In this case, the bag body of a front airbag 90 provided in the steering wheel 10 and a bag body of a front vehicle occupant seat airbag 92 provided in an instrument panel on the front vehicle occupant seat side may be opened. Through the above-described process, the vehicle occupant protection device can be appropriately operated.

When the first seat 20 does not face the second seat 40 and an impact is received from the right side of the vehicle M, the vehicle occupant protection controller 86 may open the bag body 31R of the side airbag 30R of the first seat 20 and the bag body 51R of the side airbag 50R of the second seat 40. When an impact is received from the left side of the vehicle M, the vehicle occupant protection controller 86 may open the bag body 31L of the side airbag 30L of the first seat 20 and the bag body 51L of the side airbag 50L of the second seat 40. In this case, the bag body of the side airbag SA of the vehicle interior seat on which no vehicle occupant is sitting may not be opened.

FIG. 5 is referred to back in the description. When the first seat 20 faces the second seat 40, the seat state detector 84 determines whether vehicle occupants are sitting on the first seat 20 and the second seat 40 (step S106). When the vehicle occupants are not sitting on the first seat 20 and the second seat 40, the process proceeds to step S102. When an impact is detected in the process of step S102, the vehicle occupant protection controller 86 opens the bag bodies of the side airbags SA provided the vehicle interior seats to protect the vehicle occupants from the impact depending on a situation of the vehicle (step S104).

For example, the vehicle occupant protection controller 86 opens the bag body of the side airbag SA which is in a direction in which the vehicle M receives the impact. When the first seat 20 faces the second seat 40 and the vehicle M receives an impact from the front direction of the vehicle M, the vehicle occupant protection controller 86 may open the bag body 31R of the side airbag 30R of the first seat 20 and the bag body 51L of the side airbag 50L of the second seat 40. When the vehicle M receives an impact from the rear side of the vehicle M, the vehicle occupant protection controller 86 may open the bag body 31L of the side airbag 30L of the first seat 20 and the bag body 51L of the side airbag 50L of the second seat 40. In this case, the bag body of the side airbag SA of the vehicle interior seat on which no vehicle occupant is sitting may not be opened. For example, when no vehicle occupant is sitting on the second seat 40, the bag body 51 of the side airbag 50 may not be opened.

When the vehicle occupants are sitting on the first seat 20 and the second seat 40, the vehicle occupant protection controller 86 determines whether an impact is detected based on detection results of the acceleration sensors 72 (step S108). When no impact is detected, the process of the one routine of the flowchart ends.

Figure 7:
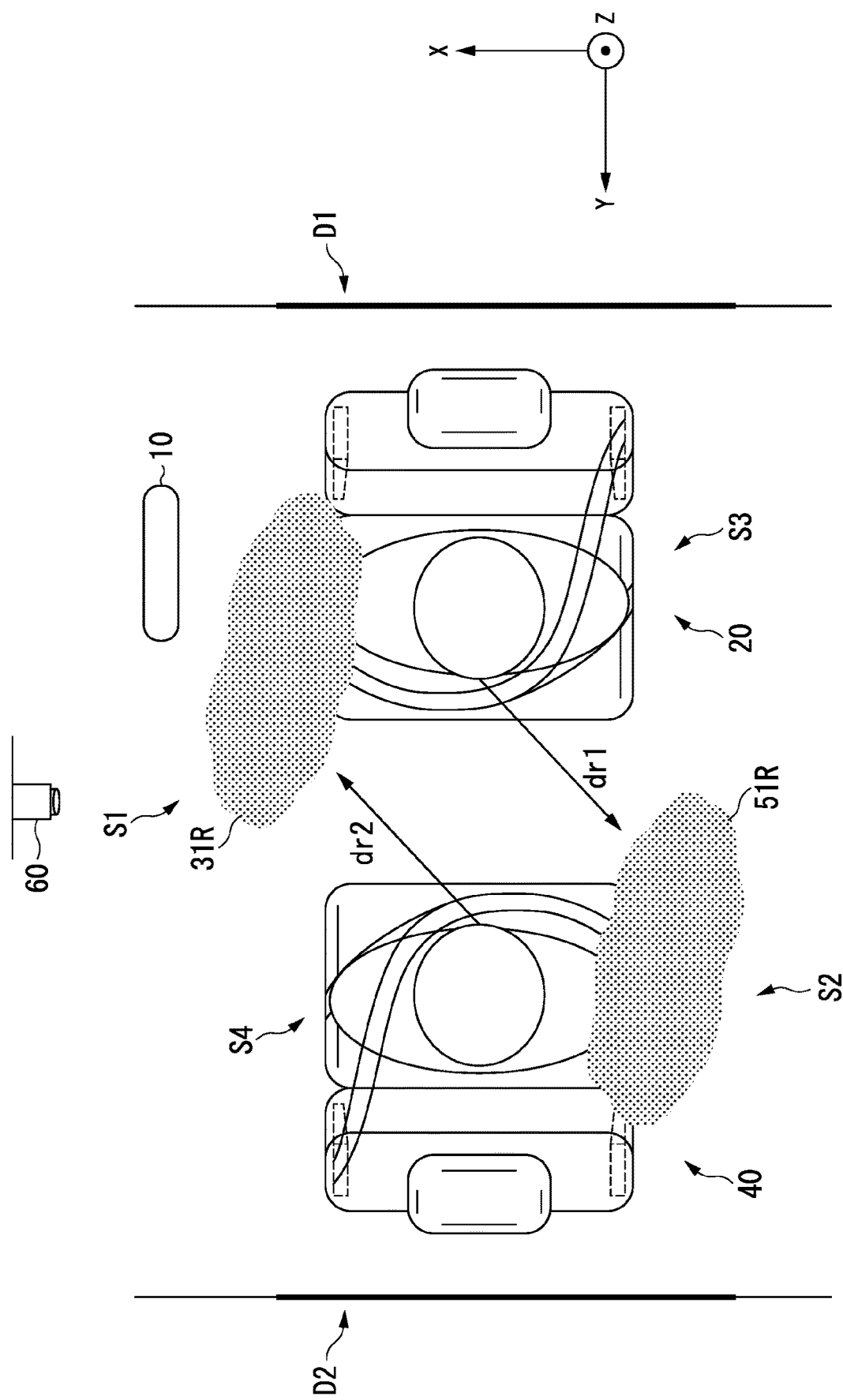
FIG. 7 is a diagram showing a form in which bag bodies are opened so that vehicle occupants do not come into contact with each other.

When the impact is detected, the vehicle occupant protection controller 86 opens the bag body 31R of the side airbag 30R provided in the first seat 20 and the bag body 51R of the side airbag 50R provided in the second seat 40 so that the vehicle occupant sitting on the first seat 20 and the vehicle occupant sitting on the second seat 40 do not come into contact with each other (step S110). FIG. 7 is a diagram showing a situation in which bag bodies are opened so that vehicle occupants do not come into contact with each other. Thus, contact between the vehicle occupants sitting on the vehicle interior seats is suppressed.

For example, a case in which an impact is detected to be received in the transverse direction of the vehicle M (for example, the positive Y direction or the negative Y direction) in disposition of the vehicle interior seats shown in FIG. 7 will be considered. In this case, when the bag body 31R of the side airbag 30R and the bag body 51L of the side airbag 50L are opened, the upper bodies of the vehicle occupants are moved in the same direction and the vehicle occupants thus come into contact with each other due to a resultant force of a force pressed in accordance with the opening of the bag body 31R of the side airbag 30R and the bag body 51L of the side airbag 50L and a force received by the vehicle M in the transverse (Y) direction. Even when the bag body 31 of the side airbag 30 and the bag body 51 of the side airbag 50 are not opened, the vehicle occupants are moved in the Y direction due to a force generated due to the impact in the transverse direction and the vehicle occupants are thus moved in the same direction and come into contact with each other in some cases.

In contrast, the vehicle occupant protection controller 86 according to the embodiment opens the bag bodies of the side airbags SA which are diagonal to each other (for example, the bag bodies 31R and 51R or the bag bodies 31L and 51L of the side airbags SA) so that the vehicle occupants do not come into contact with each other, as shown in FIG. 7. When the bag bodies of the side airbags SA are opened, a direction in which the upper body of the vehicle occupant sitting on the first seat 20 is moved is denoted by "dr1" in the drawing and a direction in which the upper body of the vehicle occupant sitting on the second seat 40 is moved is denoted by "dr2" in the drawing due to a resultant force of a force pressed in accordance with the opening of the bag bodies of the side airbags SA and a force received by the vehicle M in the transverse direction. That is, the upper bodies of the vehicle occupants are oriented in the front and rear directions of the seats with respect to the facing direction of the width direction of the seat due to acceleration at the time of an impact and forces of the air bags SA pressing the vehicle occupants, the vehicle occupants are avoided from each other, and contact between the vehicle occupants is suppressed. In this way, the vehicle occupant protection controller 86 can appropriately operate the side airbags SA.

Further, in the embodiment, the vehicle occupant protection controller 86 opens the bag bodies of the side airbags SA opened in regions on sides on which the shoulders of the vehicle occupants are not bound by the seat belts 28 and 48 so that the vehicle occupants do not come into contact with each other. That is, the vehicle occupant protection controller 86 opens, for example, the bag bodies 31R and MR of the side airbags. In this way, even when the bag body of the side airbag SA is opened in the region in which the shoulder of the vehicle occupant is not bound and the vehicle occupant is thus pressed in accordance with the opening of the bag body of the side airbag SA, the seat belt 28 or 48 suppresses detaching of the upper body of the vehicle occupant from the vehicle interior seat. More specifically, the vehicle occupant protection controller 86 operates the pretensioner 29 when the bag body of the side airbag SA is opened in the region on the side on which the shoulder of the vehicle occupant is not bound, thereby suppressing detaching of the pressed upper body of the vehicle occupant from the vehicle interior seat. Thus, it is possible to more reliably protect the vehicle occupant in the vehicle.

In the above-described embodiment, the side airbags SA opened when an impact is detected have been described. Instead of this, the side airbags SA may be opened when an impact is predicted to occur within a predetermined time. In this case, the vehicle occupant protection controller 86 predicts that the vehicle M comes into contact with an object within a predetermined time and an impact occurs when a value obtained by dividing a relative distance between the vehicle M and the object by a relative speed is equal to or less than a threshold based on information input from an external sensor. When the vehicle M is predicted to come into contact with the object, the vehicle occupant protection controller 86 opens the side airbags SA or operates the pretensioners in a direction in which the object approaches before an impact is detected. The external sensor is a radar device that detects the position of an object using a camera imaging the outside of the vehicle or millimeter radio waves or the like, a finder that measures scattered light of radiated light and detects a distance to a target, or the like.

As described above, the directions in which the upper bodies of the vehicle occupants sitting on the seats are moved are controlled by the side airbags SA. Therefore, even when the direction or the disposition of the first seat 20 or the second seat 40 is changed, the vehicle occupant can appropriately protected. Thus, it is possible to alleviate limitation on the direction or the disposition of the first seat 20 or the second seat 40.

As shown in FIG. 7, when the bag bodies of the side airbags SA are opened so that the vehicle occupants do not come into contact with each other, the vehicle occupant protection controller 86 opens the bag body 31R of the side airbag 30R on a first side S1 which is the outside of the width of the first seat 20 and opens the bag body 31R of the side airbag 30R on a second side S2 which is the outside of the width of the second seat 40. Thus, the vehicle occupant protection controller 86 opens the bag body 31R to a position including a region to which the upper body of the second vehicle occupant is estimated to be moved by opening the bag body 51R and opens the bag body 51R to a position including a region to which the upper body of the first vehicle occupant is estimated to be moved by the opening of the bag body 31R. Then, the bag body 31R of the side airbag 30R catches the upper body of the vehicle occupant sitting on the second seat 40 moved in accordance with the bag body 51R of the side airbag 50R and the bag body 51R of the side airbag 50R catches the upper body of the vehicle occupant sitting on the first seat 20 moved by the bag body 31R of the side airbag 30R. As a result, it is possible to more reliably protect the vehicle occupants of the vehicle M.

The vehicle occupant protection controller 86 may open the bag body of the side airbag SA closer in a direction in which the vehicle M receives an impact between the bag bodies of the side airbags SA based on a detection result of the acceleration sensor 72 when the first seat 20 faces the second seat 40. For example, when a larger impact is received on the first side S1 than on a fourth side S4, the bag bodies 31R and 51R may open. When a larger impact is received on the fourth side S4 than on the first side S1, the bag bodies 31L and 51L may be opened. In this case, the degree of the opening of the bag body of the seat different from the side on which a larger impact is received may be less than the degree of the opening of the bag body of the seat on which a larger impact is received.

When the seat state detector 84 detects that the first seat 20 faces the second seat 40 and an impact is determined to be received in a direction oriented from the first side S1 to the second side based on a detection result of the acceleration sensor 72, the vehicle occupant protection controller 86 opens the bag body 31R without opening the bag body 51R. When it is determined that an impact is received in a direction oriented from the second side S2 to the first side, the vehicle occupant protection controller 86 may open the bag body 51R without opening the bag body 31R.

Figure 8:
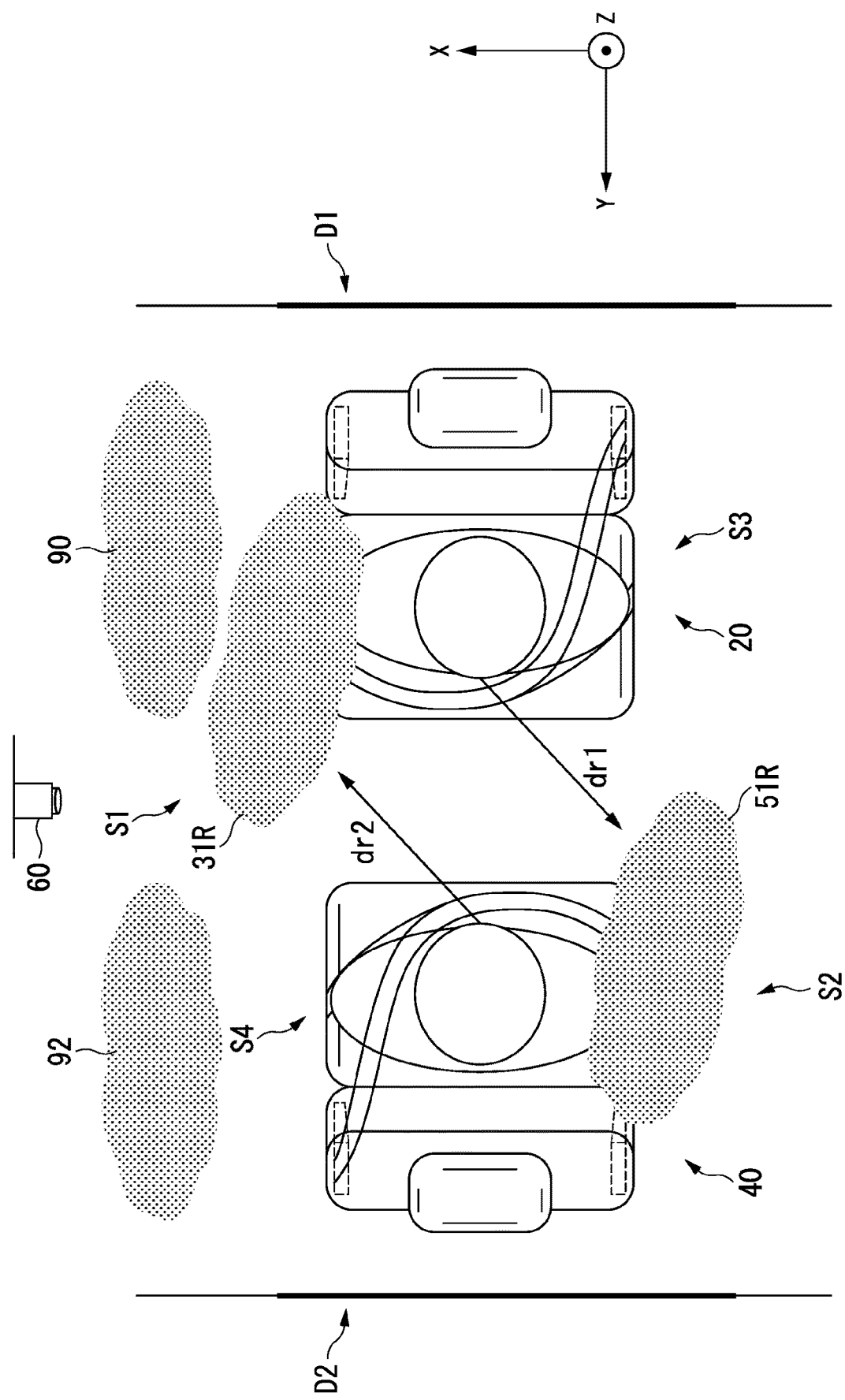
FIG. 8 is a diagram showing a situation in which a front airbag 90 and a front vehicle occupant seat airbag 92 are opened in addition to the bag bodies 31R and 51R.

As shown in FIG. 8, the bag body of the front airbag provided in the steering wheel 10 and the bag body of the front seat airbag provide in the instrument panel on the front seat side may be opened in addition to the opening of the side airbags SA. FIG. 8 is a diagram showing a situation in which the front airbag 90 and the front vehicle occupant seat airbag 92 are opened in addition to the bag bodies 31R and 51R.

When the seat state detector 84 detects that the first seat 20 does not face the second seat 40, the vehicle occupant protection controller 86 may narrow the opening regions in which the bag bodies of the side airbags SA are opened more than when the seat state detector 84 detects that the first seat 20 faces the second seat 40. Thus, it is possible to quickly open the bag bodies. In addition, it is possible to open the bag bodies to regions in which it is necessary to protect the vehicle occupants.

The side airbags SA may be provided on both sides in the width direction of the first seat 20 and the second seat 40, but the present invention is not limited to both sides and the side airbag may be provided on only one side. For example, the bag body 31R may be provided in the first seat 20 and the bag body 51R may be provided in the second seat 40. Alternatively, the bag body 31L may be provided in the first seat 20 and the bag body 51L may be provided in the second seat 40.

In the embodiment, the directions in which the upper bodies of the vehicle occupants sitting on the seats are moved are controlled using the side airbags SA, but the present invention is not limited to the side airbags SA and directions in which the upper bodies of the vehicle occupants are moved may be controlled by other airbags provided inside the vehicle.

The process of opening the bag bodies of the side airbags SA so that the vehicle occupants do not come into contact with each other according to the above-described embodiment may be applied only when an impact is received in the transverse direction of the vehicle M in which the vehicle occupants come into contact with each other due to the impact and may not be applied when an impact is received in a traveling direction of the vehicle M in which the vehicle occupants rarely come into contact with each other due to the impact.

According to the above-described first embodiment, when the first seat 20 faces the second seat 40 and an impact on the vehicle M is detected or predicted, the vehicle occupant protection controller 86 can appropriately operate the side airbags SA by controlling at least one of the side airbag SA provided in the first seat 20 and the side airbag SA provided in the second seat 40 so that contact between the vehicle occupant sitting on the first seat 20 and the vehicle occupant sitting on the second seat 40 is suppressed.

Second Embodiment

Hereinafter, a second embodiment will be described. In the first embodiment, the example in which the bag bodies of the side airbags SA provided in the first seat 20 and the second seat 40 disposed side by side in the transverse direction of the vehicle M are opened has been described. In the second embodiment, however, an example in which the bag bodies of the side airbags provided in the first seat 20 and a third seat 120 disposed side by side in a traveling direction of the vehicle M are provided will be described. Here, differences from the first embodiment will be mainly described and the description of the common functions to those of the first embodiment will be omitted.

Figure 9:
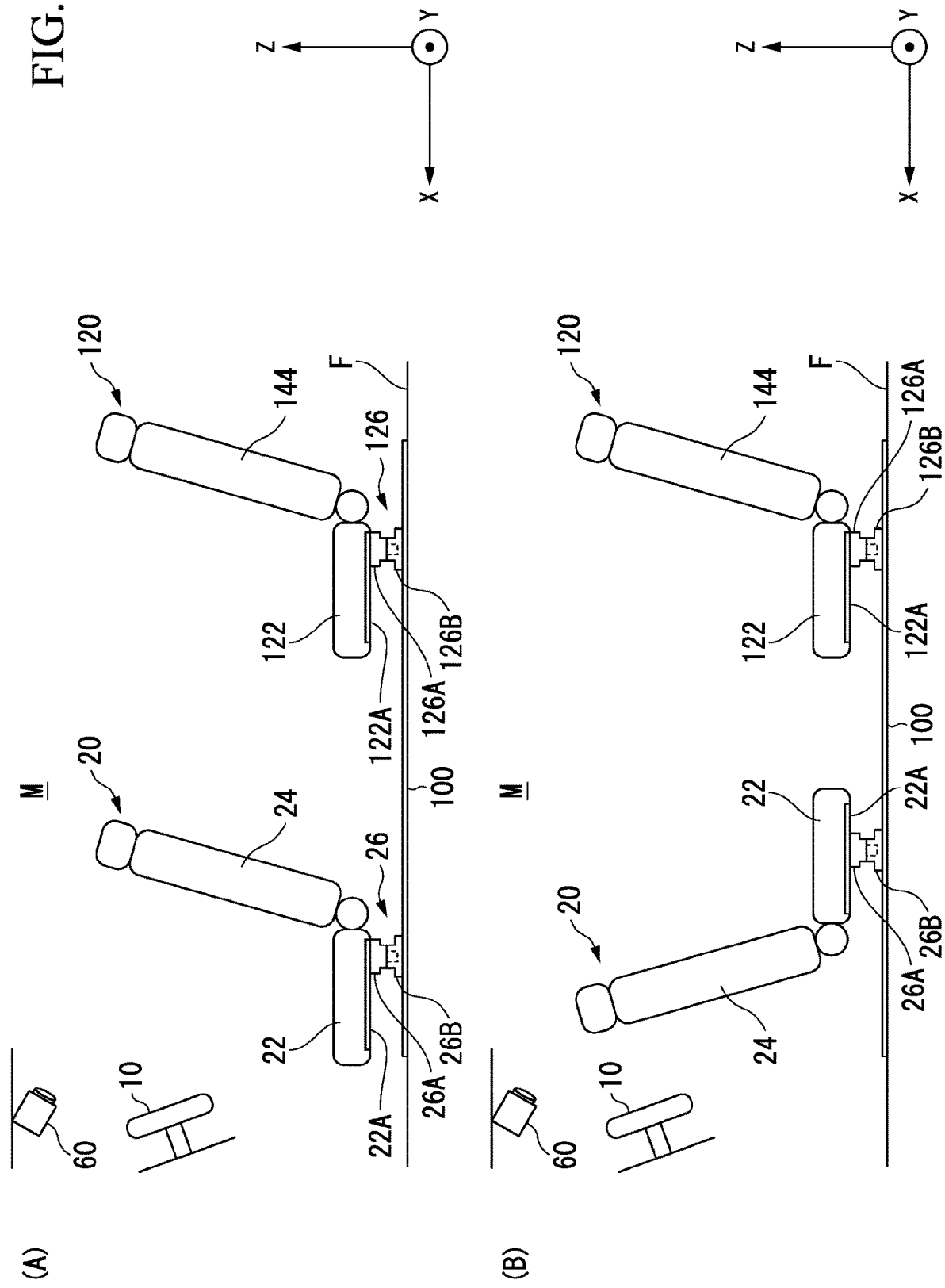
FIG. 9 is a diagram showing an example of a vehicle interior according to a second embodiment.

FIG. 9 is a diagram showing an example of a vehicle interior according to the second embodiment. As shown in FIG. 9(A), the vehicle M includes the third seat 120 in addition to the functional configuration of the first embodiment. The third seat 120 is a set provided back the first seat 20. The third seat 120 has a similar configuration to that of the first seat 20. In the functional configuration of the third seat 120, reference 100 is added to the reference numerals used in the functional configuration of the first seat 20.

On the side of a floor F of the seat portion 22 of the first seat 20, a slide mechanism 22A is provided in the X direction. A seat-side supporter 26A of the rotation supporter 26 can be slid with respect to the slide mechanism 22A. The third seat 120 also includes a slide mechanism 122 and a seat portion support 126A as in the first seat 20. The seat portion support 126A can be slid with respect to the slid mechanism 122A.

On the floor F of the vehicle M, a slide mechanism 100 is provided in the X direction. A floor-side supporter 26B of the rotation supporter 26 in the first seat 20 can be slid with respect to the slide mechanism 100. The third seat 120 includes a floor-side supporter 126B as in the first seat 20. The floor-side supporter 126B can be slid with respect to the slide mechanism 100.

For example, a vehicle occupant can slide the first seat 20 (the floor-side supporter 26B) with respect to the slide mechanism 100 in the negative X direction. The vehicle occupant can rotate the first seat 20 by 180 degrees to face the third seat 120 so that the backrest 24 of the first seat 20 does not collide with the steering wheel 10 by moving the first seat in the negative X direction. Then, the vehicle occupant can slide the seat portion 22 (the seat-side supporter 26A) with respect to the slide mechanism 22A in the X direction. Thus, as shown in FIG. 9(B), the first seat 20 can be faced with the third seat 120 and a gap between the first seat 20 and the third seat 120 can be adjusted to a desired gap. As a result, it is possible to improve comfort of the vehicle occupant in the vehicle. When the vehicle occupant slides the first seat 20 (the floor-side supporter 26B) with respect to the slide mechanism 100 or slides the seat portion 22 (the seat-side supporter 26A) with respect to the slide mechanism 22A, the vehicle occupant can perform the foregoing sliding operation by operating a predetermined operator to control the slide mechanism and a sliding target member such that the slide mechanism and a sliding target member are released from a fixed state.

Figure 10:
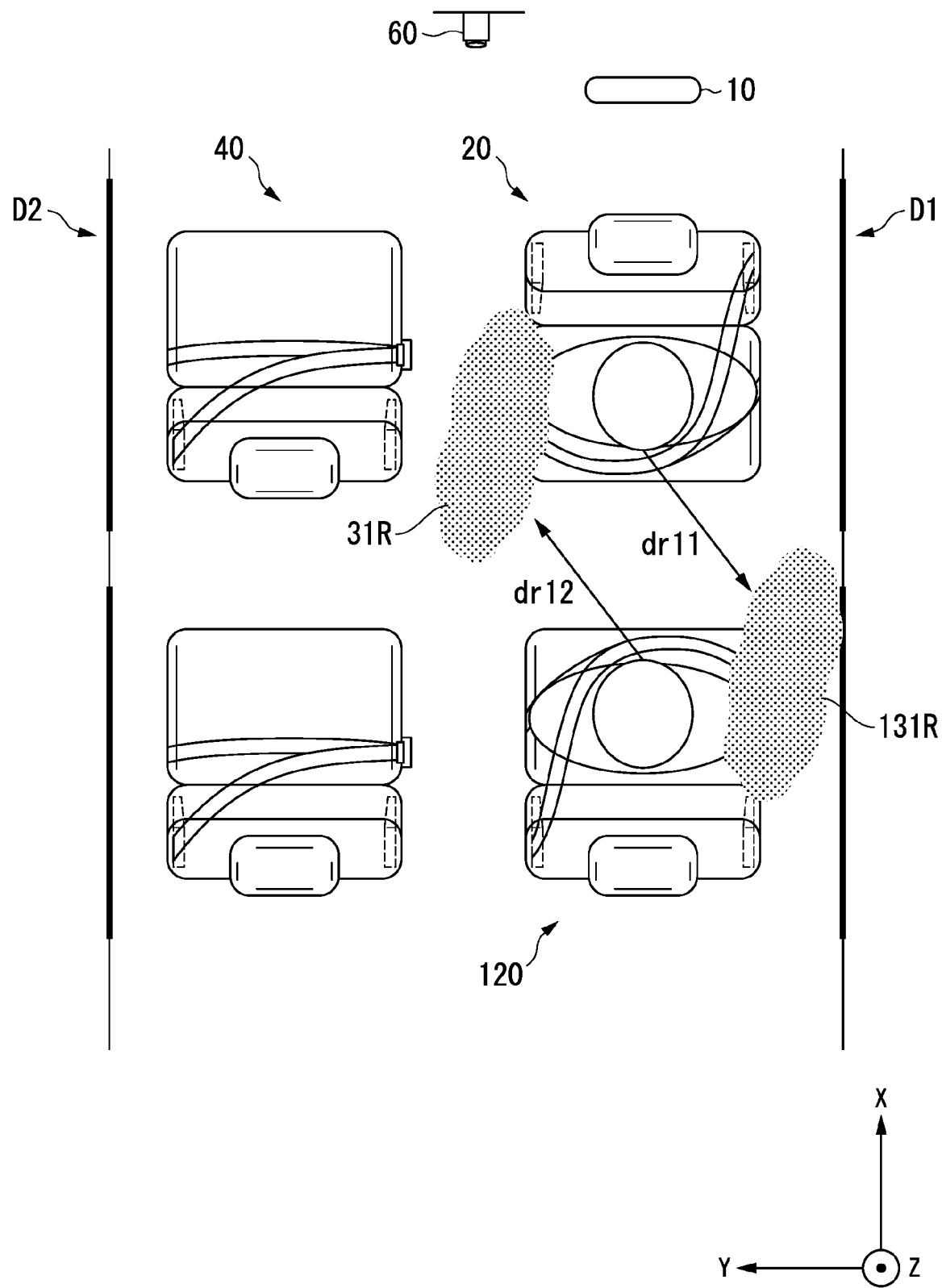
FIG. 10 is a diagram showing an example of a scenario in which the bag body of a side airbag SA is opened in a state in which the first seat 20 faces a third seat 120.

FIG. 10 is a diagram showing an example of a scenario in which the bag body of the side airbag SA is opened when the first seat 20 faces the third seat 120. When the first seat 20 faces the third seat 120, vehicle occupants are sitting on the first seat 20 and the third seat 120, and an impact is detected, the vehicle occupant protection controller 86 opens the bag body 31R of the side airbag 30R provided in the first seat 20 and a bag body 131R of a side airbag 130R provided in the third seat 120 so that the vehicle occupants sitting on the first seat 20 do not come into contact with the vehicle occupant sitting on the third seat 120. Thus, a direction in which the vehicle occupant sitting on the first seat 20 is moved is denoted by "dr11" in the drawing and a direction in which the vehicle occupant sitting on the third seat 120 is moved is denoted by "dr12" in the drawing. That is, the directions in which the vehicle occupants are moved are directions in which the vehicle occupants do not come into contact with each other and the contact between the vehicle occupants is suppressed.

When a curtain airbag 96 is provided on the side of a door D1 of the vehicle M, a bag body of the curtain airbag may be further opened.

The process of opening the bag bodies of the side airbags SA so that the vehicle occupants do not come into contact with each other according to the above-described second embodiment may be applied only when an impact is received in the longitudinal direction of the vehicle M in which the vehicle occupants easily come into contact with each other due to the impact and may not be applied when an impact is received in a transverse direction of the vehicle M in which the vehicle occupants rarely come into contact with each other due to the impact.

According to the above-described second embodiment, even when the first seat 20 and the third seat 120 are disposed side by side in the traveling direction of the vehicle M, the vehicle occupant protection controller 86 can appropriately operate the side airbags SA.

According to the above-described embodiment, the seat state detector 84 detects the directions of the first seat 20 and the second seat 40 inside the vehicle M. The vehicle occupant protection controller 86 opens at least one of the bag body 31 provided in the first seat 20 and the bag body 131 provided in the first seat 40 when the seat state detector 84 detects that the first seat 20 faces the second seat 40 and an impact on the vehicle M is detected or predicted. By pressing the first vehicle occupant sitting on the first seat on the second side in accordance with the opening of the first bag body or pressing the second vehicle occupant sitting on the second seat on the first side in accordance with the opening of the second bag body, it is possible to appropriately operate the vehicle occupant protection device.

Modes for carrying the present invention have been described using the embodiments, but the present invention is not limited to these embodiments and various modifications and substitutions can be made within the scope of the present invention without departing from the gist of the present invention.

REFERENCE SIGNS LIST

1 Vehicle system
20 First seat
40 Second seat
27, 47 Seat angle sensor
28, 48 Seat belt
30, 50 Side airbag
31, 51 Bag body
72 Acceleration sensor
80 Vehicle protection controller
84 Seat state detector
86 Vehicle occupant protection controller
M Vehicle

What is claimed is:

1. A vehicle occupant protection control device comprising:
a seat state detector configured to detect directions of a first seat and a second seat inside a vehicle, wherein the first seat comprises a first side and a second side in a width direction of the first seat, and wherein the second seat comprises a first side and a second side in a width direction of the second seat; and
based on the seat state detector determining the first seat and the second seat are in a state in which the first seat faces the second seat and an impact on the vehicle is detected or predicted, a vehicle occupant protection controller is configured to open at least one of a first bag body that opens on the first side of the first seat and a second bag body that opens on the second side of the second seat, wherein, based on the first seat facing the second seat, the first side of the first seat is diagonal to the second side of the second seat,
wherein a first vehicle occupant sitting on the first seat is moved toward the second side of the second seat based on an opening of the first bag body or a second vehicle occupant sitting on the second seat is moved toward the first side of the first seat based on an opening of the second bag body,
wherein the vehicle occupant protection controller is configured to open the first bag body to a position including a region to which an upper body of the second vehicle occupant is estimated to be moved in accordance with the opening of the second bag body and opens the second bag body to a position including a region to which an upper body of the first vehicle occupant is estimated to be moved in accordance with the opening of the first bag body.

2. The vehicle occupant protection control device according to claim 1,
wherein the first bag body is provided in the first seat, and wherein the second bag body is provided in the second seat.

3. The vehicle occupant protection control device according to claim 1, wherein, when the seat state detector detects that the first seat faces the second seat and the impact on the vehicle is detected or predicted, the vehicle occupant protection controller is configured to open the first bag body based on a first determination that the first bag body is positioned closer to a side on which the impact is received than the second bag body or configured to open the second bag body based on a second determination that the second bag body is positioned closer to the side on which the impact is received than the first bag body.

4. The vehicle occupant protection control device according to claim 1,
wherein a first seat belt of the first seat binds a first shoulder of the first vehicle occupant, and wherein a second seat belt of the second seat binds a first shoulder of the second vehicle occupant,
wherein the first side of the first seat is a side on which a second shoulder of the first vehicle occupant is not bound by the first seat belt, and
wherein the second side of the second seat is a side on which a second shoulder of the second vehicle occupant is not bound by the second seat belt.

5. The vehicle occupant protection control device according to claim 1, wherein the vehicle occupant protection controller is configured to open the first bag body on the first side of the first seat and a first location of the first bag body is beyond a width of the first seat and opens the second bag body on the second side and a second location of the first bag body is beyond a width of the second seat.

6. The vehicle occupant protection control device according to claim 1,
wherein the first seat further includes a third bag body that opens on the second side of the first seat,
wherein the second seat further includes a fourth bag body that opens on the first side of the second seat wherein, based on the first seat facing the second seat, the second side of the first seat is diagonal to the first side of the second seat, and
wherein, when the seat state detector detects that the first seat faces the second seat and the impact on the vehicle is detected or predicted, the vehicle occupant protection controller is configured to open the third bag body based on a first determination that the third bag body is positioned closer to a side on which the impact is received as compared to the fourth bag body, or open the fourth bag body based on a second determination that the fourth bag body is positioned closer to the side on which the impact is received as compared to the third bag body.

7. The vehicle occupant protection control device according to claim 1,
wherein the first seat further includes a third bag body that opens on the second side of the first seat,
wherein the second seat further includes a fourth bag body that opens on the first side of the second seat wherein, based on the first seat facing the second seat, the second side of the first seat is diagonal to the first side of the second seat, and
wherein, when the seat state detector does not detect that the first seat faces the second seat and the impact on the vehicle is detected or predicted, the vehicle occupant protection controller is configured to open the first bag body and the fourth bag body.

8. The vehicle occupant protection control device according to claim 1, wherein, when the seat state detector does not detect that the first seat faces the second seat and the impact on the vehicle is detected or predicted, the vehicle occupant protection controller narrows an opening region in which the first bag body is opened more than when the seat state detector detects that the first seat faces the second seat.

9. A vehicle occupant protection control method causing an in-vehicle computer to perform:
detecting directions of a first seat and a second seat inside a vehicle, wherein the first seat comprises a first side and a second side in a width direction of the first seat, and wherein the second seat comprises a first side and a second side in a width direction of the second seat;

based on the first seat and the second seat being in a state in which the first seat faces the second seat and an impact on the vehicle is detected or predicted, opening at least one of a first bag body on the first side of the first seat and a second bag body on the second side of the second seat, wherein, based on the first seat facing the second seat, the first side of the first seat is diagonal to the second side of the second seat; and causing a first movement of a first vehicle occupant sitting on the first seat toward the second side of the second seat in accordance with the opening of the first bag body or causing a second movement of a second vehicle occupant sitting on the second seat toward the first side of the first seat in accordance with the opening of the second bag body, wherein the opening comprises:
 opening the first bag body to a position including a region to which an upper body of the second vehicle occupant is estimated to be moved in accordance with an opening of the second bag body, and
 opening the second bag body to a position including a region to which an upper body of the first vehicle occupant is estimated to be moved in accordance with the opening of the first bag body.

10. A non-transitory computer-readable storage medium that stores a computer program to be executed by a computer to perform at least:

detecting directions of a first seat and a second seat inside a vehicle, wherein the first seat comprises a first side and a second side in a width direction of the first seat, and wherein the second seat comprises a first side and a second side in a width direction of the second seat;

based on the first seat and the second seat being in a state in which the first seat faces the second seat and an impact on the vehicle is detected or predicted, opening at least one of a first bag body on the first side of the first seat and a second bag body on the second side of the second seat, wherein, based on the first seat facing the second seat, the first side of the first seat is diagonal to the second side of the second seat and the second side of the first seat is diagonal to the first side of the second seat, of the second seat; and causing a first movement of a first vehicle occupant sitting on the first seat toward the second side of the second seat in accordance with the opening of the first bag body or causing a second movement of a second vehicle occupant sitting on the second seat toward the first side of the first seat in accordance with the opening of the second bag body, wherein the opening comprises:
 opening the first bag body to a position including a region to which an upper body of the second vehicle occupant is estimated to be moved in accordance with the opening of the second bag body, and
 opening the second bag body to a position including a region to which an upper body of the first vehicle occupant is estimated to be moved in accordance with the opening of the first bag body.

* * * * *